United States Patent [19]
Senghaas et al.
[11] Patent Number: 5,027,284
[45] Date of Patent: Jun. 25, 1991

[54] AUTO-SET DRINK DISPENSER

[75] Inventors: Karl A. Senghaas; Peter Senghaas; Jerzy Michalec, all of San Antonio, Tex.
[73] Assignee: The Cornelius Company, Anoka, Minn.

[21] Appl. No.: 329,754
[22] Filed: Mar. 28, 1989
[51] Int. Cl.[5] ......................... G06F 15/24; B67D 5/14
[52] U.S. Cl. ................................ 364/479; 222/129.4; 222/144.5; 222/71
[58] Field of Search ...................... 364/479, 144, 465; 137/624.11, 606; 141/1, 198, 210, 311 R, 317; 222/129.4, 71, 144.5

[56] References Cited

U.S. PATENT DOCUMENTS

| | | | |
|---|---|---|---|
| 2,639,078 | 5/1953 | Karlen | 226/127 |
| 3,670,765 | 6/1972 | Haynes | 137/392 |
| 3,839,645 | 10/1974 | Nickerson | 137/392 |
| 3,916,963 | 11/1975 | McIntosh | 141/198 |
| 4,236,553 | 12/1980 | Reichenberger | 141/198 |
| 4,276,999 | 7/1981 | Reichenberger | 222/129.4 |
| 4,317,475 | 3/1982 | Miller et al. | 141/95 |
| 4,328,539 | 5/1982 | Heeger | 364/144 |
| 4,437,497 | 3/1984 | Enander | 141/1 |
| 4,458,735 | 7/1984 | Houman | 141/95 |
| 4,522,237 | 6/1985 | Endo et al. | 141/95 |
| 4,549,675 | 10/1985 | Austin | 222/129 |
| 4,559,979 | 12/1985 | Koblasz et al. | 141/9 |
| 4,641,692 | 2/1987 | Bennett | 141/95 |
| 4,708,155 | 11/1987 | Austin et al. | 137/1 |
| 4,712,591 | 12/1987 | McCann et al. | 141/88 |
| 4,738,285 | 4/1988 | Belland | 141/1 |
| 4,753,277 | 6/1988 | Holcomb et al. | 141/95 |
| 4,800,492 | 1/1989 | Johnson et al. | 364/403 |
| 4,817,689 | 4/1989 | Stembridge et al. | 141/198 |
| 4,821,925 | 4/1989 | Wiley et al. | 222/129.4 |
| 4,890,774 | 1/1990 | Poore | 222/640 |

FOREIGN PATENT DOCUMENTS 2921663 5/1979 Fed. Rep. of Germany .

*Primary Examiner*—Jerry Smith
*Assistant Examiner*—Paul Gordon
*Attorney, Agent, or Firm*—Kinney & Lange

[57] ABSTRACT

A control system for use with a drink dispenser comprises a mode switch for causing the control system to switch between operation in a program mode and a dispense mode. Volumetric parameter data is provided by a volumetric parameter generator and is representative of dispensed drink volume. A memory stores the volumetric parameter data. A controller is coupled to the mode switch, the memory and the volumetric parameter generator and causes the volumetric parameter data to be stored in the memory while the control system is operating in the program mode and causes drink volume to be dispensed as a function of the stored volumetric parameter data while the control system is operating in the dispense mode.

40 Claims, 4 Drawing Sheets

AUTO-SET DRINK DISPENSER

BACKGROUND OF THE INVENTION

1. Field of the Invention

This invention relates to a method and apparatus for controlling a drink dispenser. More particularly, this invention relates to a method and apparatus for programming a drink dispenser during a program mode and to dispense beverage as a function of stored volumetric parameter data during a dispense mode.

2. Description of the Prior Art

Drink dispensers have generally taken one of three forms. The first form involves mechanical levers which respond to the presence of a cup under a dispensing valve. For an operator to fill a glass of liquid, the operator places a cup under the dispensing valve thereby depressing the mechanical lever which, in turn, opens the dispensing valve and allows liquid to pour into the cup. In order to fill the cup to the proper level, the operator must devote full attention to the cup. Although the operator could fill one cup with each hand, this type of drink dispenser is very inefficient.

The second form is a portion control which utilizes a spray of liquid being dispensed to complete a link in an electrical circuit between an actuating lever and the liquid flowing through the dispensing valve. A cup is placed under the dispensing valve thereby actuating the actuating lever. As the liquid level in the cup rises, the spray increases. Consequently, the impedance in the electrical circuit decreases allowing greater current to flow through the electrical circuit. When a predetermined level of current is reached, the dispensing valve is shut off. This type of dispenser is described in detail in U.S. Pat. No. 4,641,692 to Bennett.

The third form is a conventional portion control type drink dispenser. The portion control type drink dispenser operates on a timed dispensing cycle which assumes constant fluid flow through the dispensing valve. A known cup size and a known amount of ice in the cup are also assumed. A dispenser timer is triggered by momentary actuation of a push button for a given drink size. The dispensing valve stays open during the dispensing cycle which is timed by the dispenser timer. Therefore, an operator may place a cup under the dispensing valve, press the push button for the desired drink size and attend to other chores while the cup is being filled.

However, many drinks dispensed through this type of dispenser are carbonated. Therefore, an operator may be required to allow the foam on the drink to settle, after it has been initially filled by the dispenser, and then to manually top off the drink. This is inefficient from the standpoint of the operator.

Also, this type of drink dispenser generally utilizes individual trimming potentiometers to vary dispense time for each drink size. Therefore, when this type of drink dispenser is being installed, the trimming potentiometers must all be adjusted to allow the proper volume of liquid to be dispensed for each drink size. Also, re-adjustment is occassionally required to maintain proper operation of the dispenser. A maladjusted dispenser can result, for instance, in "short" timed dispensing cycles which fail to fill the cup all the way. Any re-adjustment also requires adjusting the trimming potentiometers.

Timing correction required during installation or re-adjustment usually involves dumping the partially filled cup content, turning the trimming potentiometer for the drink size being adjusted and re-actuating the push button to see if the desired volume of liquid is dispensed. Typically, adjustments take several iterations before the trimming potentiometers are set properly.

This "trial and error" procedure results in undesirable waste of beverage and time. Adjusting all the liquid dispensers in a restaurant can waste an undesirable amount of time and cause gallons of drinks to be wasted. Therefore, there is a need for a drink dispenser which can be automatically set to dispense the proper volume of liquid while pouring the first drink from the dispenser so that no beverage is wasted.

Additionally, since many carbonated beverages are dispensed through drink dispensers, there is a need for an automatic drink dispenser which fills a cup, allows the foam on the drink to settle, and tops off the drink automatically.

SUMMARY OF THE INVENTION

The present invention is a control system for use with a drink dispenser. Mode switch means causes the control system to switch between operation in a program mode and a dispense mode. Volumetric parameter means provide volumetric parameter data representative of dispensed drink volume. Memory means store the volumetric parameter data. Control means, coupled to the mode switch means, the memory means, and the volumetric parameter means, causes the volumetric parameter data to be stored in the memory means while the control system is operating in the program mode. Also, the control means causes drink volume to be dispensed as a function of the stored volumetric parameter data while the control system is operating in the dispense mode.

DETAILED DESCRIPTION OF THE PREFERRED EMBODIMENTS

Figure 1:
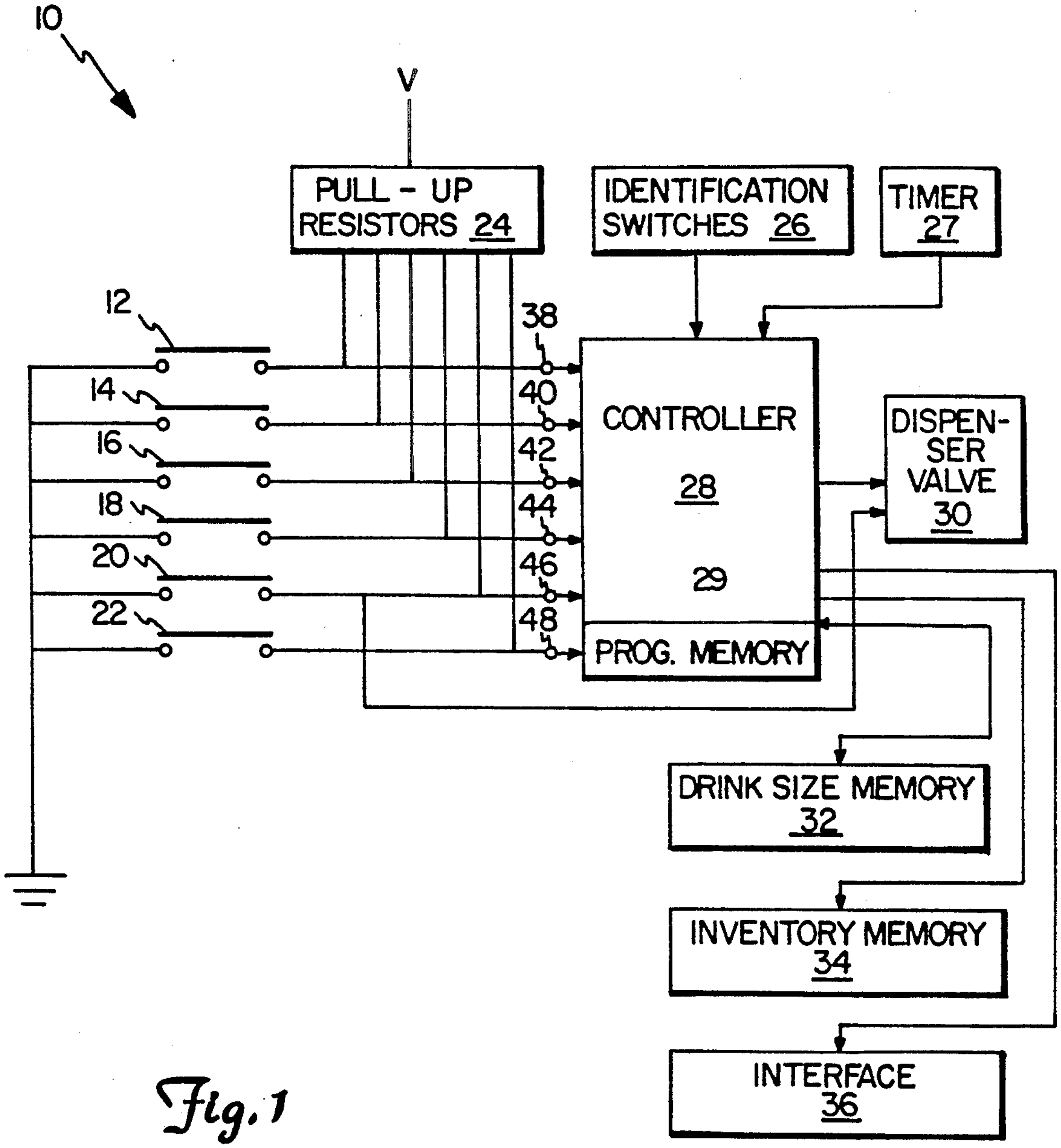
FIG. 1 is a block diagram of the control system of the present invention.

FIG. 1 is a block diagram of control system 10 of the present invention. Control system 10 comprises small drink size dispenser button 12, medium drink size dispenser button 14, large drink size dispenser button 16 and extra large drink size dispenser button 18 (collectively referred to as size dispenser buttons 12, 14, 16 and 18). Control system 10 also has cancel/pour (C/P) switch 20, mode switch 22, pull-up resistors 24, identification switches 26, timer 27, controller 28, drink size memory 32, inventory memory 34 and interface 36. FIG. 1 also shows dispenser valve 30 which is typically a dispenser valve on a commercially available dispenser assembly.

Size dispensing buttons 12, 14, 16 and 18, which are CommerCially available push-buttons, are coupled to controller 28 at small input 38, medium input 40, large input 42 and extra large input 44, respectively. Size dispenser buttons 12, 14, 16 and 18 are also coupled to pull-up resistors 24 which pull inputs 38, 40, 42 and 44 to a logic high level when size dispenser buttons 12, 14, 16 and 18 are open. When any of buttons 12, 14, 16 Or 18 are closed, the corresponding input 38, 40, 42 or 44 are pulled to a logic low level.

Similarly, cancel/pour switch 20 and mode switch 22 are coupled to controller 28 at cancel/pour input 46 and mode input 48. These inputs are also coupled to pull-up resistors 24.

Controller 28 is a microprocessor-based controller which periodically polls inputs 38–48. Based on these inputs, controller 28 controls operation of dispenser valve 30, drink size memory 32 and inventory memory 34 as a function of a program stored in program memory 29.

Figure 2:
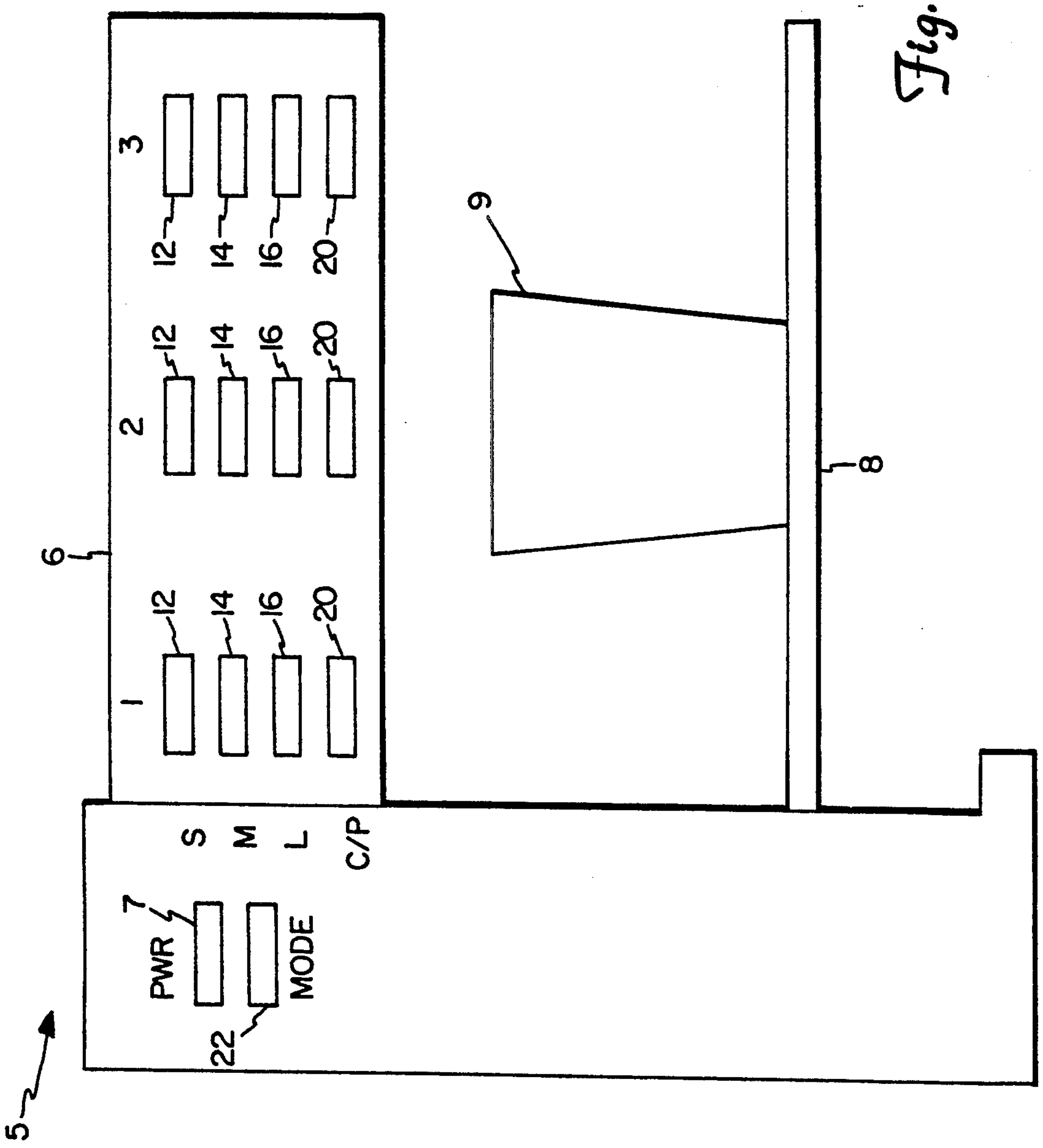
FIG. 2 is a diagram of a dispensing tower.

A plurality of control systems 10 are typically used in a drink dispensing tower such as drink dispensing tower 5 shown in FIG. 2. In this embodiment, dispensing tower 5 is provided with housing 6 which contains three drink dispenser valves (not shown) each of which dispenses a different flavored drink.

Each drink dispenser valve is operated by a separate control system 10. All of the control systems 10 are also housed in housing 6. Therefore, each dispenser valve has a corresponding small size dispenser button 12, medium size dispenser button 14, large size dispenser button 16 (in this embodiment, only three drink sizes are provided so extra large button 18 is omitted) and cancel/pour (C/P) switch 20.

Dispensing tower 5 also has power switch 7, cup tray 8 and mode switch 22. Mode switch 22 switches control systems 10 in housing 6 between operation in a program mode (described more fully later) and operation in a dispense mode.

Figure 3:
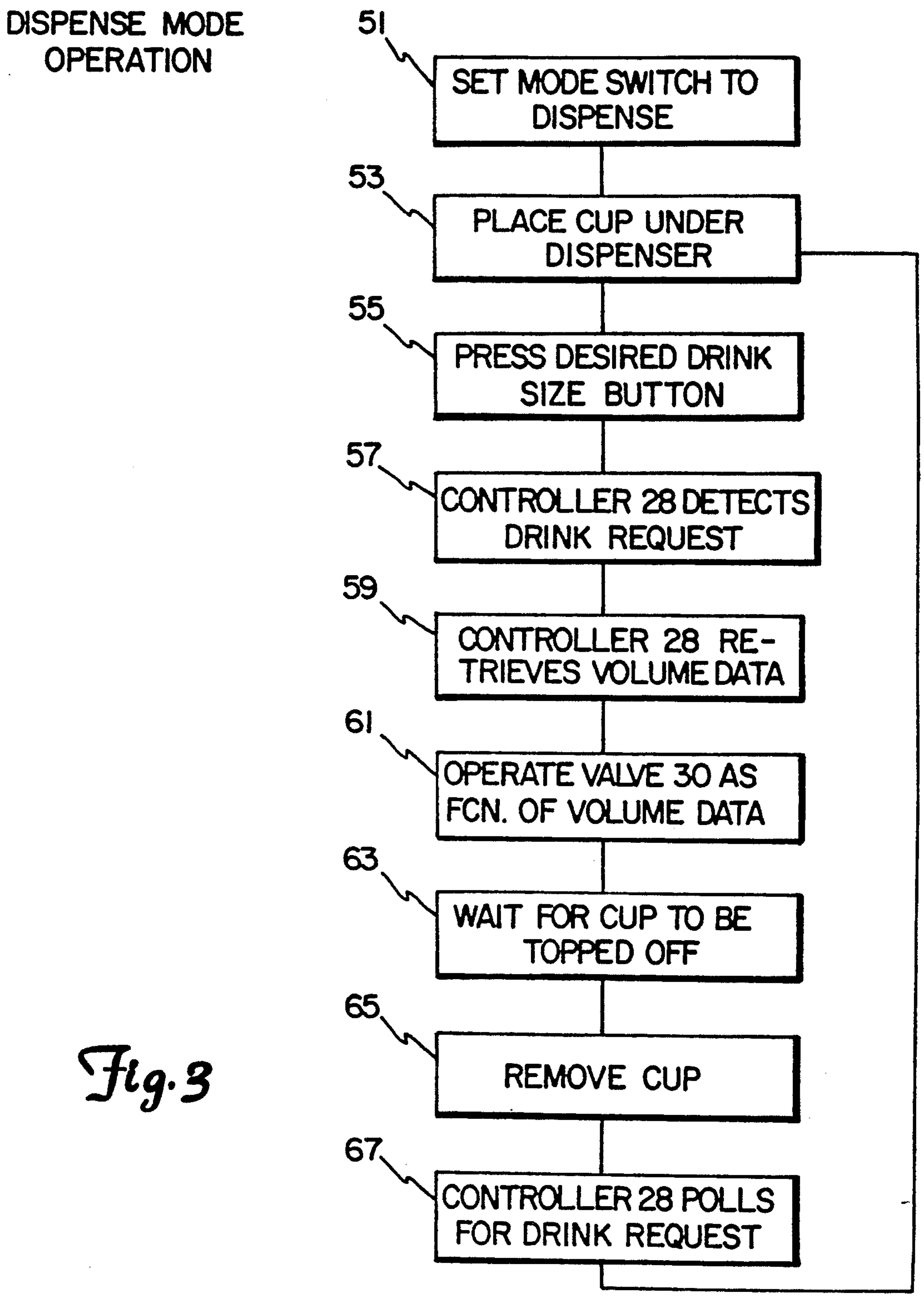
FIG. 3 is a flow chart of dispense mode operation of the present invention.

FIG. 3 shows a flow diagram of dispense mode operation. To begin operation in the dispense mode, an operator sets mode switch 22 to dispense. This is indicated by block 51. Next, the operator places cup 9 (shown in FIG. 2) under the dispenser valve which dispenses the desired drink flavor, as indicated by block 53. The operator then requests the desired drink size by pressing the corresponding size dispenser button 12, 14 or 16. This is indicated by block 55.

Since controller 28 polls inputs 38–48, controller 28 detects the drink request by the operator as a logic low level on a corresponding input. For example, if the operator desires a small drink to be filled, the operator presses small drink size button 12. Consequently, small input 38 is pulled to a logic low level. This logic low level at small input 38 is detected by controller 28 as indicated by block 57.

Upon detecting the request for a small drink, controller 28 retrieves volume data from drink size memory 32 which was programmed into drink size memory 32 during the program mode. The volume data represents the amount of time which dispenser valve 30 must be open to fill a small cup. This is indicated by block 59. After retrieving the volume data, controller 28 operates dispensing valve 30 as a function of the volume data to properly fill cup 9. This is indicated by block 61.

To properly fill cup 9, controller 28 operates dispensing valve 30 as a function of the volume data in substantially three steps. First, controller 28 actuates dispensing valve 30 for a main-fill time period during which liquid is allowed to pour into cup 9. Second, controller 28 de-actuates dispensing valve 30 for a settle time period during which any foamy liquid in cup 9 is allowed to settle. Finally, controller 28 reactuates dispensing valve 30 for a top-off time period to top-off cup 9. Controller 28 monitors timer 27 to time the main-fill, the settle and the top-off time periods. All of these time periods are represented by the volume data retrieved by controller 28 from drink size memory 32.

The operator waits for the cup to be topped off and removes the cup. This is indicated by blocks 63 and 65. After topping off the cup, controller 28 again begins to poll inputs 38-48 for another drink request.

During the program mode, controller 28 stores volume data which is representative of the volume of liquid to be dispensed in response to a drink request by any of size dispenser buttons 12, 14, 16 or 18. The volume data is programmed by an operator and stored by controller 28 in drink size memory 32.

Figure 4:
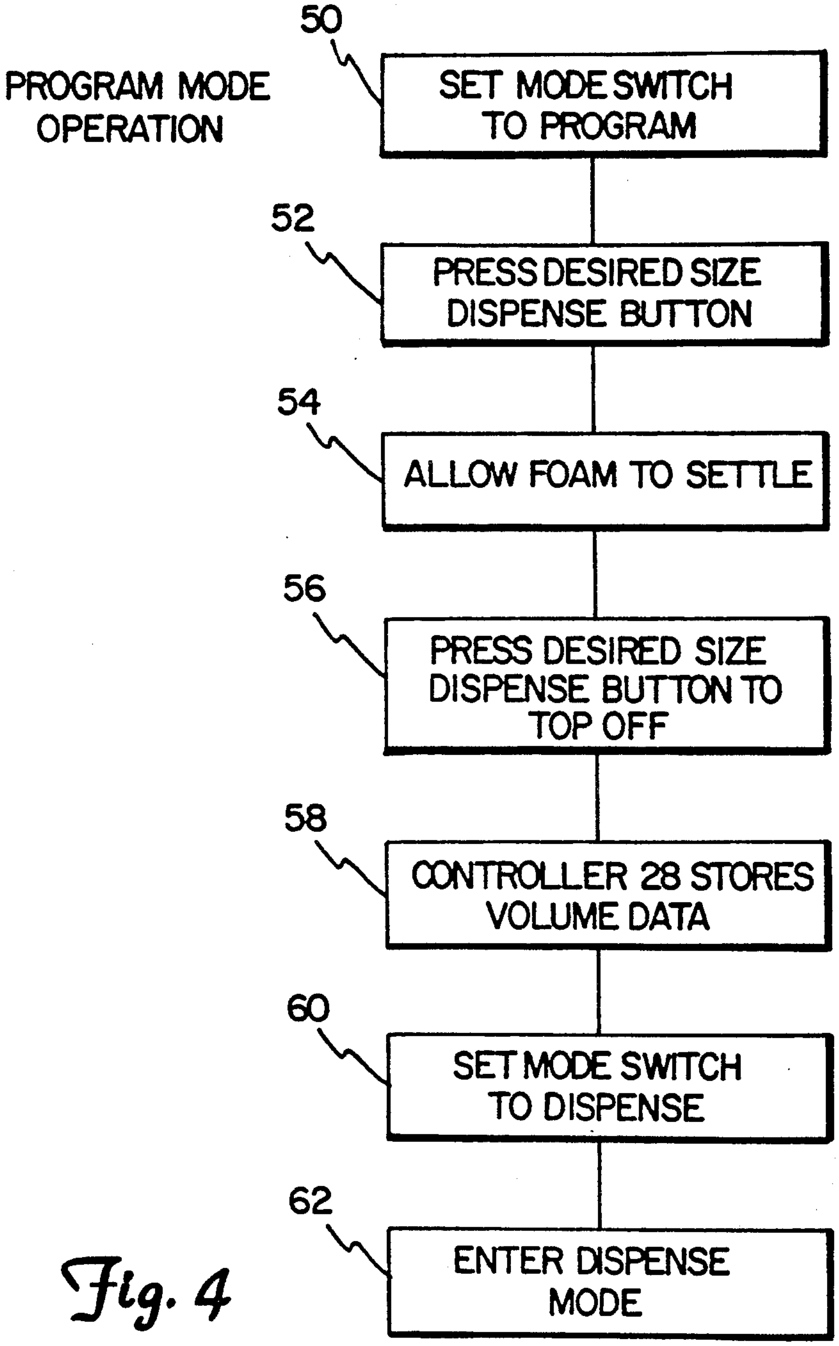
FIG. 4 is a flow chart of program mode operation of the present invention.

FIG. 4 shows a flow chart of program mode operation of control system 10. To enter the program mode, switch 22 is switched to program (i.e., it is closed). This is indicated by block 50. Once control system 10 is in the program mode, control system 10 is ready to be programmed with volume data.

To begin programming, the operator first places cup 9 under dispenser valve 30, then depresses a size dispenser button 12, 14, 16 or 18 corresponding to the drink size to be programmed. (For example, if control system 10 is to be programmed with volume data representing the volume of a small drink, then small size drink dispenser button 12 is depressed.) While the operator has the desired size dispenser button depressed, dispenser valve 30 is actuated allowing liquid to pour into cup 9. The operator keeps the desired size dispenser button depressed until the foam in cup 9 reaches the brim. Then, the operator allows button 12 to open thereby causing controller 28 to de-actuate dispenser valve 30 for a time period which is long enough to allow the foam in the cup to settle. These steps are indicated by blocks 52 and 54. Once the foam has settled, the operator depresses the desired size dispense button again in order to top off the drink. This is indicated by block 56.

During each of these steps, controller 28 monitors timer 27 to determine the length of time each step takes. Controller 28 stores time data representing the time of each step in drink size memory 32. This time data effectively represents the volume of drink dispensed by dispenser valve 30 during the initial fill step, when the desired size dispense button is depressed (the main-fill time period) during the settle step, when the desired size dispense button is not depressed (the settle time period) and during the top-off step, when the desired size dispense button is again depressed (the top-off time period). The settle time period can be a set time for all drink sizes or programmed in the same manner as the main-fill and top-off time periods. For the time data to be relied upon as an accurate representation of the volume of liquid dispensed for numerous drink requests, it is assumed that the volume flow rate of the drink through dispenser valve 30 remains substantially constant.

The steps in the program mode are repeated until control system 10 has been programmed with volume data for all the available drink sizes. Once control system 10 has been programmed with the desired volume data, and has stored that data in drink size memory 32, mode switch 22 is set to dispense (i.e., re-opened) and control system 10 enters the dispense mode as described above. This is indicated by blocks 60 and 62.

Control system 10 is also capable of automatically tracking drink inventory. During operation, controller 28 stores inventory data in inventory memory 34. The inventory data represents the volume of drink dispensed from the particular dispenser valve 30 which is controlled by control system 10. Inventory memory 34 is capable of providing inventory memory for only a single control system 10 or for all control systems 10 in a single dispense tower 5 (i.e., for all flavors). This is accomplished by utilizing identification switches 26 which are operator-settable switches that indicate to controller 28 which dispenser valve 30 (i.e., which flavor) control system 10 is controlling and which dispense tower 5 control system 10 is located in. This identification information is used, particularly in a restaurant where more than one dispense tower 5 is used, to identify the volume of each flavor of drink dispensed and which dispense tower it was dispensed from.

Cancel/pour switch 20 allows the operator to cancel a drink request by simply depressing switch 20. When switch 20 is depressed, controller 28 detects the logic low level at input 46 and cancels any drink request currently being fulfilled by controller 28. Depressing switch 20 causes dispenser valve 30 to be directly actuated and to dispense drink until cancel/pour switch 20 is re-opened. This allows a drink request to be overridden by the operator and it also allows the operator to "manually" dispense drinks. Volume data corresponding to drinks dispensed through actuation of cancel/pour switch 20 is also stored in inventory memory 34 by controller 28.

Control system 10 is also provided with interface 36. This allows control system 10 to be coupled to a printer, a monitor or another controller to provide volume and inventory data. Therefore, an operator using control system 10 is capable of automatically tracking inventory and downloading all inventory data to another device for inventory report generation.

Due to the simplicity and size of control system 10, it can be customized to individual dispenser housings 6 and mounted directly behind the push buttons 12–20 on a commercial dispensing valve 30. Control system 10 is capable of being packaged with surface mount components for miniaturizating the dispenser housing 6 behind the push buttons. An assembled circuit board containing control system 10 is also capable of being conformally coated and can be encapsulated to withstand accidental plumbing leaks.

In one preferred embodiment, drink size memory 32 is an electrically erasable programmable read only memory (EEPROM). Therefore, even during extended power outages, drink size memory 32 retains the volume data which was stored in it during operation in the program mode. The particular EEPROM used in the embodiment shown in FIG. 1 is capable of being reprogrammed approximately 10,000 times.

It should be noted that, in this preferred embodiment, the volume data stored in drink size memory 32 and inventory memory 34 is provided by timer 27. Time data provided by timer 27 is substantially proportional to volume of drink dispensed. This assumes a substantially constant rate of fluid flow through dispenser valve 30. However, volume data could easily be provided through other means such as a flow meter.

CONCLUSION

Control system 10 is capable of operation in a program mode so that drink sizes can be programmed into the control system without using a trial and error technique. This permits a desired drink size to be set properly the first time the drink is filled. Therefore, the volume of wasted beverage and the time required to adjust the dispenser are substantially reduced. This also increases repeatability and accuracy of the dispenser.

Also, control system 10 permits a foamy drink to be automatically topped off after the foam has settled. Again, this feature saves time and increases the efficiency of the dispenser.

Additionally, control system 10 retains drink size information programmed during the program mode, without on board batteries, even during prolonged power outings. This makes operating the dispenser more convenient and more reliable.

Control system 10 also stores inventory information representing the number of dispensed drinks identified by size, dispenser valve (flavor) and dispenser tower. The inventory information also includes volume information representing the volume of drink dispensed through depressing cancel/pour switch 20. This inventory information is transferrable to a printer, monitor or other control system for analysis.

In addition, control system 10 is simple and small. This allows it to be packaged easily in commercial dispensers. It is also capable of being covered or encapsulated to prevent harm from leaky valves or plumbing.

Although the present invention has been described with reference to preferred embodiments, workers skilled in the art will recognize that changes may be made in form and detail without departing from the spirit and scope of the invention.

What is claimed is:

1. A control system for use with a drink dispenser, comprising:

mode switch means for causing the control system to operate in a program mode and a dispense mode;

volumetric parameter means for providing volumetric parameter data representative of dispensed drink volume;

memory means for storing the volumetric parameter data; and control means, coupled to the mode switch means, the memory means and the volumetric parameter means, for causing the volumetric parameter data to be stored in the memory means during operation in the program mode and for causing drink volume to be dispensed as a function of the stored volumetric parameter data during operation in the dispense mode.

2. The control system of claim and further comprising:

dispense switch means, coupled to the control means, for causing the drink dispenser to be activated and for causing the control means to monitor the volumetric parameter data from the volumetric parameter means.

3. The control system of claim 2 wherein:

the dispense switch means is activated a first time to dispense a main drink volume and a second time to dispense a top-off drink volume during operation in the program mode; and the control means includes means for causing top-off parameter data representative of the top-off volume and main volume parameter data representative of the main volume to be stored in the memory means.

4. The control system of claim 3 wherein the control means includes means for dispensing drink volume as a function of the main volume data and top-off volume data during operation in the dispense mode.

5. The control system of claim 4 wherein:

the dispense switch is de-activated for a settle time period between dispensing the main drink volume and the top-off drink volume during operation in the program mode; and the control means discontinues dispensing for a time period after dispensing the main volume and before dispensing the top-off volume during operation in the dispense mode.

6. The control system of claim 1 wherein the memory means further comprises:

drink size memory means for storing the volumetric parameter data during operation in the program mode; and inventory memory means for storing accumulated volumetric parameter data during operation in the dispense mode.

7. The control system of claim 6 wherein activation of the dispense switch means causes the control means to store volumetric parameter data in the drink size memory means representative of the volume of liquid dispensed by activation of the dispense switch means during operation in the program mode.

8. The control system of claim 7 wherein activation of the dispense switch means causes the control means to store accumulated volumetric parameter data in the inventory memory means representative of the volume of liquid dispensed by activation of the drink dispenser during operation in the dispense mode.

9. The control system of claim 8 wherein the control means includes:

means for retrieving volumetric parameter data from the drink size memory means in response to activation of the dispense switch means during operation in the dispense mode; and means for causing liquid to be dispensed as a function of the volumetric parameter data retrieved.

10. The control system of claim 9 wherein the dispense switch means further comprises:

a plurality of size dispense buttons each corresponding to a different volume of liquid to be dispensed and each causing the control means to retrieve parameter data from the drink size memory means representative of the different volume of liquid when the dispense button is activated during operation in the dispense mode; and a cancel/pour button.

11. The control system of claim 10 wherein each size dispense button causes the control means to store volumetric parameter data representing a different volume of liquid in the drink size memory means when the size dispense button is activated during operation in the program mode.

12. The control system of claim 10 wherein each size dispense button and the cancel/pour button include:

13. The control system of claim 6 wherein the control means further comprises:

inventory control means for determining drink volume dispensed based on the accumulated volumetric parameter data stored in the inventory memory means.

14. The control system of claim 6 wherein the drink size memory means further comprises:

electrically erasable programmable read only memory.

15. The control system of claim 1 wherein the volumetric parameter means further comprises:

timer means for providing time data representative of time that the control means causes liquid to be dispensed and time that the control means allows foam to settle.

16. The control system of claim 15 wherein the control means includes:

means for providing the drink volume dispensed and the volumetric parameter data to a plurality of other systems.

17. A method of controlling operation of a liquid dispenser, comprising:

switching the liquid dispenser into a program mode;

activating the liquid dispenser until a dispensed;

desired volume of liquid is storing a volume parameter representative of volume of liquid dispensed;

switching the liquid dispenser into an operational mode; and controlling the liquid dispenser as a function of the stored volume parameter.

18. The method of claim 17 wherein:

activating the liquid dispenser includes:

activating the liquid dispenser for a first time to dispense a main volume;

de-activating the liquid dispenser for a settle period; and activating the dispenser a second time to dispense a top-off volume;

storing a volume parameter includes:

storing main volume parameter data representative of the main volume; and storing top-off volume data representative of the top-off volume; and controlling the liquid dispenser includes:

dispensing liquid as a function of the main volume parameter data;

discontinuing dispensing for a settle time period; and dispensing liquid as a function of the top-off volume data.

19. The method of claim 17 and further comprising: repeating the steps of activating the liquid dispenser and storing a volume parameter for a plurality of desired volumes of liquid.

20. The method of claim 17 wherein the step of storing a volume parameter further comprises:

monitoring volume data representative of volume of liquid dispensed; and storing a volume parameter representative of the volume data.

21. The method of claim 20 wherein the step of monitoring volume data further comprises:

monitoring fill time data from a timer means representing time when the liquid dispenser is activated; and monitoring settling time data from a timer means representing a time period when foam is settling.

22. The method of claim 21 and further comprising: storing the inventory volume data in inventory memory means.

23. The method of claim 22 and further comprising: determining volume of liquid dispensed during operation of the liquid dispenser based on the inventory volume data stored in the inventory memory means.

24. The method of claim 23 and further comprising: providing the volume of liquid dispensed to coupling means, the coupling means being capable of coupling to other systems.

25. The method of claim 17 and further comprising:

monitoring inventory volume data representative of the volume of liquid dispensed during operation of the liquid dispenser.

26. The method of claim 25 wherein the step of monitoring inventory volume data further comprises:

monitoring time data from a timer means when the liquid dispenser is activated.

27. The method of claim 17 wherein the step of activating the liquid dispenser further comprises:

opening and closing dispenser valve means, to dispense liquid, a plurality of times until the desired volume of liquid is dispensed.

28. A control system for controlling a drink dispenser, comprising:

dispenser switch means for causing activation of the dispenser;

mode switch means for selecting program and dispense modes of operation;

volumetric parameter means for providing volumetric parameter data representative of dispensed drink volume;

memory means for storing the volumetric parameter data; and control means, coupled to the dispenser switch means, the mode switch means, the volumetric parameter means and the memory means for causing volumetric parameter data representative of a volume of drink dispensed by activation of the dispenser switch means during operation in the program mode to be stored in the memory means, and for causing the dispenser to dispense drink volume as a function of the stored volumetric parameter data in response to activation of the dispenser switch means during operation in the dispense mode.

29. The control system of claim 28 wherein the dispense switch means includes:

means for causing drink volume to be dispensed in a fill cycle by activating and deactivating the dispenser a plurality of times during operation in the program mode until a desired volume of liquid is dispensed.

30. The control system of claim 29 wherein the control means includes:

means for storing volumetric parameter data in the memory means representative of drink volume dispensed during each activation of the dispense switch means in the fill cycle during operation in the program mode.

31. The control system of claim 30 wherein the control means includes:

means for storing volumetric parameter data representative of time when the dispense switch means is de-activated in the fill cycle during the program mode.

32. The control system of claim 30 wherein the control switch means further comprises:

a plurality of drink size dispense buttons wherein each drink size dispense button corresponds to a different desired drink volume and wherein each drink size dispense button has a fill cycle to dispense the desired drink volume corresponding to the drink size dispense button.

33. The control system of claim 32 wherein the control means includes:

means for storing volumetric parameter data representative of each fill cycle in the memory means during operation in the program mode in response to activation and de-activation of the corresponding drink size dispense button.

34. The control system of claim 28 wherein the memory means further comprises:

inventory memory means; and drink size memory means.

35. The control system of claim 34 wherein the control means includes:

means for storing volumetric parameter data in the inventory memory means during operation in the dispense mode.

36. The control system of claim 34 wherein the control means includes:

means for storing volumetric parameter data in the drink size memory means during operation in the program mode.

37. The control system of claim 36 wherein the control means includes:

means for retrieving volumetric parameter data from the drink size memory during operation in the dispense mode in response to activation of the dispenser switch means.

38. The control system of claim 37 wherein the drink size memory means further comprises:

stable memory means for retaining stored volumetric parameter data during extended periods without power.

39. The control system of claim 38 wherein the stable memory means further comprises:

electrically eraseable programmable read only memory.

40. A control system for controlling a drink dispenser, comprising:

a mode switch for selecting program and dispense modes of operation;

a plurality of dispenser buttons, each corresponding to a different desired drink volume, for causing the desired drink volume to be dispensed, in the program mode, by causing activation of the dispenser until a main drink volume is dispensed, de-activation of the dispenser until drink foam settles and re-activation of the dispenser until a top-off drink volume is dispensed, and for causing the desired drink volume to be dispensed during the dispense mode;

a volumetric parameter generator for providing volumetric parameter data representative of dispensed drink volume;

memory means for storing the volumetric parameter data; and a controller, coupled to the dispenser buttons, the mode switch, the volumetric parameter generator and the memory means, for causing volumetric parameter data, representative of the drink volume dispensed during the program mode in response to activation of the dispenser by each dispense button, to be stored in the memory means and for causing drink volume to be dispensed as a function of the stored volumetric parameter data in response to activation of a dispense button in the dispense mode.

* * * * *

UNITED STATES PATENT AND TRADEMARK OFFICE
CERTIFICATE OF CORRECTION

PATENT NO. : 5,027,284

DATED : June 25, 1991

INVENTOR(S) : Karl A. Senghaas et al.

It is certified that error appears in the above-identified patent and that said Letters Patent is hereby corrected as shown below:

Col. 6, line 47, delete "claim", insert --claim 1--.

Col. 7, delete lines 53-54, insert the following:

12. The control system of claim 10 wherein each size dispense button and the cancel/pour button include:

means for causing the control means to store volumetric parameter date representing volume of liquid dispensed in the inventory memory means when the size dispense button or the cancel/pour button is activated during operation in the dispense mode.

Col. 8, line 11, delete "dispensed;".

UNITED STATES PATENT AND TRADEMARK OFFICE

CERTIFICATE OF CORRECTION

PATENT NO. : 5,027,284 Page 2 of 2

DATED : June 25, 1991

INVENTOR(S) : Karl A. Senghaas, et al

It is certified that error appears in the above-identified patent and that said Letters Patent is hereby corrected as shown below:

Col. 8, line 12, after "liquid is", insert --dispensed;--.

Signed and Sealed this

Twenty-seventh Day of October, 1992

*Attest:*

DOUGLAS B. COMER

*Attesting Officer* *Acting Commissioner of Patents and Trademarks*